US011633776B2

(12) United States Patent
Del Fabro

(10) Patent No.: US 11,633,776 B2
(45) Date of Patent: Apr. 25, 2023

(54) APPARATUS AND METHOD FOR WORKING BARS

(71) Applicant: M.E.P. Macchine Elettroniche Piegatrici S.P.A., Reana del Rojale (IT)

(72) Inventor: Giorgio Del Fabro, Udine (IT)

(73) Assignee: M.E.P.—MACCHINE ELETTRONICHE PIEGATRICI S.P.A., Reana del Rojale (IT)

(*) Notice: Subject to any disclaimer, the term of this patent is extended or adjusted under 35 U.S.C. 154(b) by 47 days.

(21) Appl. No.: 16/956,541

(22) PCT Filed: Dec. 21, 2018

(86) PCT No.: PCT/IT2018/050259
§ 371 (c)(1),
(2) Date: Jun. 19, 2020

(87) PCT Pub. No.: WO2019/123507
PCT Pub. Date: Jun. 27, 2019

(65) Prior Publication Data
US 2021/0121935 A1    Apr. 29, 2021

(30) Foreign Application Priority Data

Dec. 22, 2017   (IT) .................. 102017000149399

(51) Int. Cl.
*B21D 43/00*       (2006.01)
*B21D 11/12*       (2006.01)
(Continued)

(52) U.S. Cl.
CPC ............ *B21D 43/006* (2013.01); *B21D 11/12* (2013.01); *B21D 7/024* (2013.01); *B21D 43/285* (2013.01);
(Continued)

(58) Field of Classification Search
CPC .... B21D 43/006; B21D 43/00; B21D 43/285; B21D 43/20; B21D 43/24; B21D 43/028;
(Continued)

(56) References Cited

U.S. PATENT DOCUMENTS 4,524,656 A * 6/1985 Del Fabro ............ B21D 43/285
83/153
4,732,066 A * 3/1988 Del Fabro ............ B21F 23/007
83/277
(Continued)

FOREIGN PATENT DOCUMENTS

DE    3334043 A1 *  4/1985  .............. B21F 27/10
EP    0188850 A2    7/1986
(Continued)

OTHER PUBLICATIONS

Int'l Search Report and Written Opinion dated Feb. 22, 2019 in Int'l Application No. PCT/IT2018/050259.

*Primary Examiner* — Kristina N Junge
*Assistant Examiner* — Teresa A Guthrie
(74) *Attorney, Agent, or Firm* — Panitch Schwarze Belisario & Nadel LLP

(57) ABSTRACT

An apparatus for working bars includes a plurality of containing devices disposed adjacent and parallel to each other with an oblong development in respective longitudinal directions to contain a respective bundle of bars. At least one work station is located downstream of the containing devices. The work station includes at least one removal device to remove at least one bar from one of the containing devices, at least one drawing unit configured to move the bars in a direction of feed parallel to the longitudinal directions, and at least one bending device configured to bend the bars At least one drive member is associated with the work station, configured to move work station in a transverse direction with respect to the longitudinal direc-
(Continued)

tions in order to take the removal device into correspondence with one or the other of the containing devices, which are substantially fixed in position.

12 Claims, 3 Drawing Sheets

(51) Int. Cl.
    *B21D 7/024* (2006.01)
    *B21D 43/28* (2006.01)
    *B21F 23/00* (2006.01)

(52) U.S. Cl.
    CPC .... *B21F 23/007* (2013.01); *B65G 2201/0217* (2013.01)

(58) Field of Classification Search
    CPC .......... B21D 11/12; B21D 7/024; B21D 7/12; B21D 43/08; B21D 43/10; B21D 43/04; B21D 43/09; B21F 23/007; B65G 2201/0217

USPC .......................................................... 72/307
See application file for complete search history.

(56) References Cited

U.S. PATENT DOCUMENTS 5,228,322 A * 7/1993 Del Fabro ............ B21D 43/006
                                                                                     72/217
5,632,175 A * 5/1997 Green ...................... B21D 7/16
                                                                                      72/130

FOREIGN PATENT DOCUMENTS

| EP | 1738843 A1 | 1/2007 | |
|----|------------|--------|---|
| EP | 3159072 A1 | 4/2017 | |
| WO | WO-2010040820 A1 * | 4/2010 | ............ B21F 23/005 |

* cited by examiner

APPARATUS AND METHOD FOR WORKING BARS

FIELD OF THE INVENTION

The present invention concerns an apparatus and a method for working bars, in particular metal bars.

By the term bars we mean in general oblong shaped products such as, for example, rod, reinforcement rods, round bars, square bars or suchlike. The bars can therefore be used, for example, in the construction field as reinforcement for concrete structures, for example, but not only, beams or pillars.

BACKGROUND OF THE INVENTION

Apparatuses are known for working metal products, for example, bars, reinforcement rods, section bars, tubes or other profiles with any section shape, to obtain semi-finished products to be used as reinforcement in building structures.

These apparatuses can comprise bending machines, stirrup-making machines, cutting plants, counting machines, or other machines.

These apparatuses generally require a feed apparatus able to dispose single bars starting from bundles and to feed them sequentially, for example but not only one by one, to the respective work units, for example bending, cutting, counting units, etc.

One of said known apparatuses for working bars can comprise: a plurality of containing devices disposed adjacent and parallel to each other and having an oblong development in respective longitudinal directions to contain a respective bundle of bars; and a work station located downstream of the containing devices and comprising a device to remove at least one bar from one of the containing devices, a drawing device configured to move the bar in a direction of feed parallel to the longitudinal directions, and at least one bending device configured to bend the bars.

The containing devices thus form a modular store in which bundles or groups of bars of different types can be positioned, in which a specific type of bars will be provided for each containing device.

Apparatuses for working bars exist, in which the modular store is mobile, for example installed on guides positioned on the floor, so that it can be translated with respect to the work station so as to present, on each occasion, the chosen containing device in front of the work station provided with the bending device.

As can be understood, the provision of a mobile modular store entails, for example, the need to provide guides and movement means for the entire store, therefore the need to have available a large surface for maneuvering and space, since the modular store must be able to position from the first to the last of the containing devices in correspondence with the work station, which is fixed.

Since such apparatuses are normally housed inside warehouses or suchlike, it is clear that large spaces must be required inside these warehouses to house and maneuver the mobile store.

Furthermore, moving the mobile store requires structural interventions inside the warehouse, thus causing increases in costs and complexity of the entire work apparatus.

Furthermore, it is difficult to extend the modular mobile store with additional containing devices. Generally, if the user needs additional containing devices, for example because he is working products that require bars of different lengths compared to those already present in the containing devices, he must provide to install a new, larger mobile store, if there is available space in the warehouse.

The mobile store, therefore, does not allow to deposit bundles of bars of variable length, with the same or different diameter, to optimize production cycles.

Furthermore, another disadvantage of the mobile store is that the operator, if he needs to move/load/remove the bundles of bars of one or the other of the containing devices of the store, must stop the mobile store and therefore the work cycle of the bars, with obvious losses of efficiency on the whole work.

The mobile store, which must therefore be equipped with movement means and possible corresponding guides, also causes an increase in the weight of the entire system or apparatus.

Another disadvantage of known work apparatuses concerns the discharge step of the finished product according to a determinate work cycle, therefore, for example, suitably shaped stirrups of different types. The discharge step, in fact, often includes limits from the point of view of automation, since it is difficult to de-constrain the store that contains finished products from the rest of the work apparatus and it is generally difficult to organize suitable containing devices for each type of finished product.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to provide a work apparatus for bars, in particular metal bars, which can overcome at least one of the disadvantages of the state of the art.

One purpose of the present invention is therefore to provide an apparatus for working bars, in particular metal bars, which is automated, efficient and allows to keep the store containing the bars to be worked in a substantially fixed position, while providing at least one movement of the work station so that it presents itself each time in correspondence with one of the containing devices, in order to remove at least one bar to be worked.

Another purpose of the present invention is to provide an apparatus for working bars that allows a user to optimize the production cycles of the bars, limiting the stoppages of the apparatus and allowing to deposit and/or move the bars in the containing devices even during a specific production cycle.

Another purpose of the present invention is to provide an apparatus for working bars which allows the user to expand or reduce the store that contains the bars as desired, by adding or eliminating one or more devices that contain the bundles or units of bars, in order to optimize, as a consequence, the production cycles of the bars.

Another purpose of the present invention is to provide an apparatus for working bars having large free spaces and maneuvering space, which is compact and of smaller size and weight than known work apparatuses.

Another purpose of the present invention is to perfect an effective method for working bars, in which the work station can be moved with respect to the substantially fixed devices that contain the bars.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, according to the present invention, an apparatus for working bars, comprising a plurality of containing devices disposed adjacent and parallel to each other and with an oblong development in respective longitudinal directions to contain a respective bundle of bars and at least a work station located downstream of the containing devices, the work station comprising at least a removal device to remove at least one bar from one of the containing devices, at least a drawing unit configured to move the bars in a direction of feed parallel to the longitudinal directions, and at least a bending device configured to bend the bars.

According to one aspect of the invention, at least a drive member is associated with the work station, configured to move the work station in a transverse direction with respect to the longitudinal directions so as to take the removal device into correspondence with one or the other of the containing devices, which are substantially fixed in position.

According to another aspect of the invention, the work station comprises a support structure provided with sliding elements positionable on guides directed in the transverse direction.

A command station can be associated with the work station, able to manage and control the working operating cycle of the bars.

The command station can be associated with the support structure of the work station and is mobile together with the work station.

The work apparatus can also comprise a collection station to collect the finished products, located downstream of the work station.

The collection station of the finished products is associated with corresponding drive members and is mobile in the transverse direction.

The collection station is provided with sliding elements positionable on guides directed in the transverse direction.

The work station can be super-elevated with respect to the floor so that the collection station can be moved under the work station.

The containing devices form a modular store substantially independent of the work station of the bars and of the collection station of the finished products.

The invention also concerns a method for working bars using the apparatus for working bars described above. The method comprises at least a step of moving the work station with respect to the containing devices disposed adjacent and parallel to each other, so as to present the work station on each occasion in correspondence with one or the other of the containing devices, which are substantially fixed in position; at least a step of removing at least one bar from the containing devices; and at least a step of bending and then shaping the bar removed from the corresponding containing device by means of the work station.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
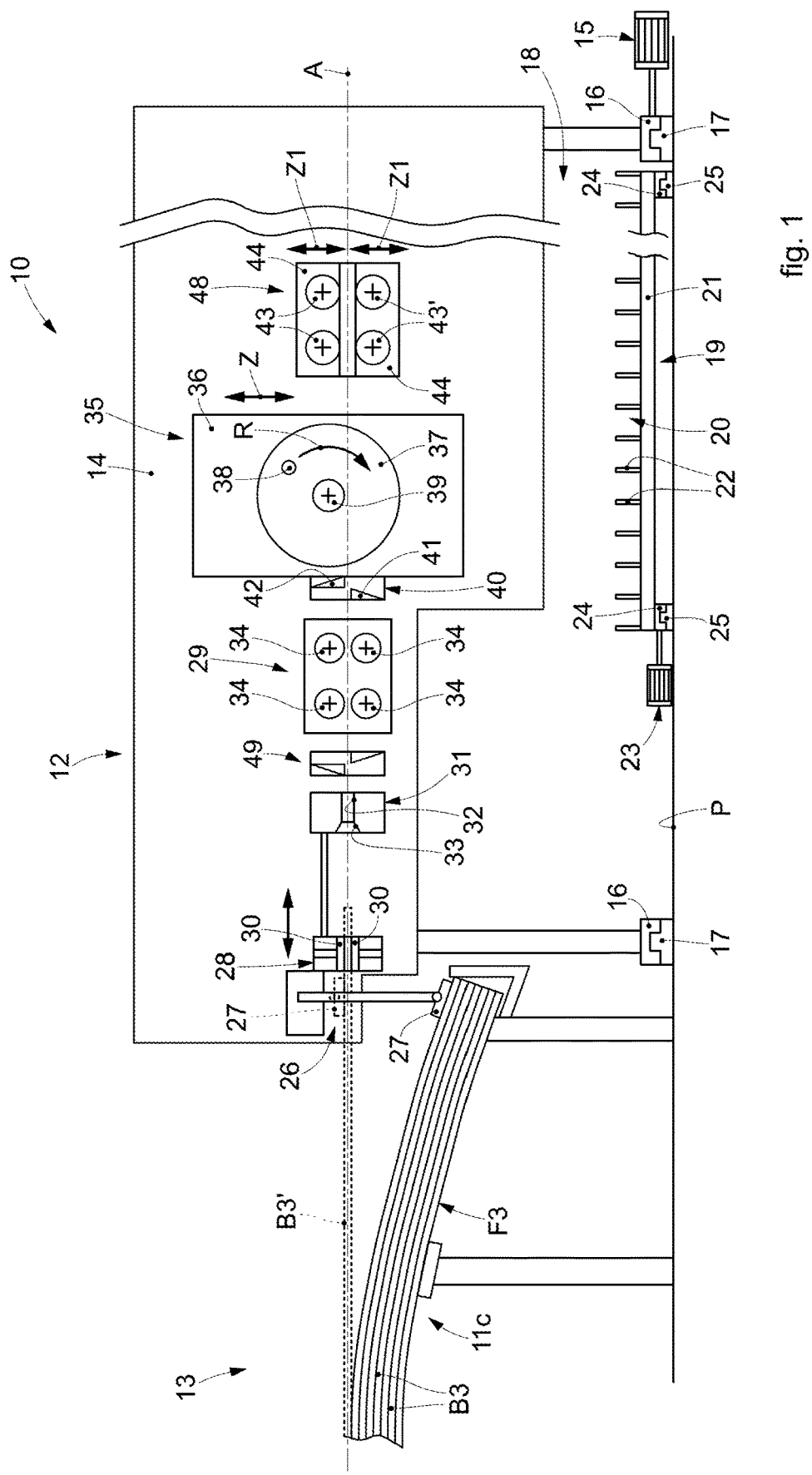
FIG. 1 is a front view of an apparatus for working bars according to the present invention.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, an apparatus 10 for working bars according to the present invention comprises a plurality of containing devices 11a-11f disposed adjacent and parallel to each other and having an oblong development in respective longitudinal directions L, to contain a respective bundle F1-F6 of bars B1-B6.

The containing devices 11a-11f therefore substantially define a modular store 13 and bars B1-B6 of different types can be deposited in the containing devices 11a-11f.

The containing devices 11a-11f are in a substantially fixed position with respect to a work station 12. The work station 12 is located downstream of the containing devices 11a-11f and is mobile at least in a transverse direction T by suitable drive members 15.

The work station 12 can comprise a support structure 14 provided with sliding elements 16, such as wheels, pads or suchlike, positioned on guides 17 made on the floor P in directions parallel to the transverse direction T.

The work station 12 can be super-elevated with respect to the floor P, so as to obtain a space 18 under it in which a collection station 19 for the finished products can transit, for example shaped products starting from the bars B1 and B6.

The collection station 19 too can be divided into a plurality of containing devices 20 suitable to receive finished products of different types.

The collection station 19 substantially comprises a pallet 21 where the containing devices 20 are positioned. The pallet 21 is also provided with retaining elements 22 for the finished products.

The collection station 19 is mobile at least in the transverse direction T by at least one corresponding drive member 23.

For example, it can be provided that the pallet 21 is provided with sliding elements 24, such as wheels, pads or suchlike, positioned on corresponding guides 25, associated with the floor P and parallel to the transverse direction T.

The work station 12 comprises at least one removal device 26 to remove at least one bar, for example bar B3' of the bundle F3 (FIG. 1).

The removal device 26 can be provided, for example, with a removal head 27 mobile downwardly to remove the bar B3' from the bundle F3 and upwardly to dispose the bar aligned with a direction of feed A, suitable to transfer it to the subsequent operating members of the work station 12. The removal head 27 can be a magnetic head or suchlike.

The direction of feed A of any of the bars, in this case for example the bar B3', is parallel to the longitudinal directions L.

Downstream of the removal device 26 an introduction unit 28 is provided, suitable to take the bar B3' toward a drawing unit 29.

In some embodiments (FIG. 1), the introduction unit 28 can comprise a gripper, for example defined by two jaws 30, and translation devices provided to move the gripper in a direction parallel to the direction of feed A to supply the bar B3' to the components located downstream. The introduction unit 28 can therefore move in a two-directional direction in the direction of feed A.

In variant embodiments, not shown, the introduction unit 28 can comprise motorized rollers between which the bar B3' is positioned and can be suitable to translate in the direction of feed A, so as to take the bar B3' toward the drawing unit 29.

Downstream of the introduction unit 28, an introduction element 31 can be provided which is suitable to correctly position the bar B3' aligned with the direction of feed A, to allow its subsequent transfer to the drawing unit 29.

The introduction element 31 can comprise, for example, a channel 32 which develops in the direction of feed A and is possibly provided with a lead-in 33 to facilitate the introduction of the bar.

Between the introduction unit 28 and the drawing unit 29 a cutting device 49 can be installed, configured to selectively cut the bar which is fed in the direction of feed A. By way of example only, the cutting device 49 can be configured to cut the tail end of the bars passing through the work station 12.

The drawing unit 29 can comprise motorized rollers 34 between which any of the bars B1-B6 can be positioned, for example bar B3', so as to be able to be transferred to a bending device 35 located downstream.

The bending device 35 can comprise a support table 36 which can be translated, by means of suitable drive means, in a direction Z which is orthogonal to the direction of feed A. This allows to position the bending device 35 on each occasion in a predefined manner in relation to the specific bending to be performed.

The bending device 35 comprises a support disk 37, on which a fixed contrast pin 39 is positioned. A bending pin 38 can rotate, for example in direction R, around the fixed contrast pin 39.

The bar can then be inserted between the bending pin 38 and the fixed contrast pin 39 and, through a suitably combined movement of rotation of the bending pin 38 and translation of the support table 36, in one direction or the other, in the direction Z substantially orthogonal to the direction of feed A, it is possible to produce a bent product starting from the bar, for example a product with a square, rectangular or other shape, such as for example a stirrup or suchlike.

Upstream of the bending device 35 a cutting unit 40 is generally provided, which can be provided, for example, with a first cutting blade 41 and a second cutting blade 42. The cutting unit 40 can be configured to cut the leading end of the bars that are fed.

The cutting unit 40 can be installed directly on the support structure 14 as shown in FIG. 1. According to a variant embodiment it can be provided that part of the cutting unit 40, for example the first cutting blade 41, is installed on the support frame 14 and part, for example the second cutting blade 42, is installed on the support table 36.

Downstream of the bending device 35 a gripping unit 48 can be provided, suitable to allow to retain a portion of bar which is made to translate in the direction of feed A, passing beyond the bending device 35, by means of the drawing unit 29.

The gripping unit 48 can be provided with rollers 43 and 43' between which the bar is positioned, and the rollers 43 can be positioned on supports 44, in which at least one of the supports 44 is suitable to translate at least in a direction Z1 substantially orthogonal to the direction of feed A. It can be provided that both these supports 44 can translate two-directionally in directions Z1, as schematically shown.

At least one of the series of rollers, for example rollers 43', can be motorized so as to allow a two-directional translation of the bar in the direction of feed A.

Once the bar has been shaped by the bending device 35, the cutting unit 40 separates the finished product from the drawing unit 29 and allows it to pass through gravity to the collection station 19 for the finished products.

It is possible to provide that the support structure 14 has a certain inclination with respect to the vertical direction, so as to provide a sort of inclined plane along which the finished products can slide until they reach the collection station 19.

Figure 2:
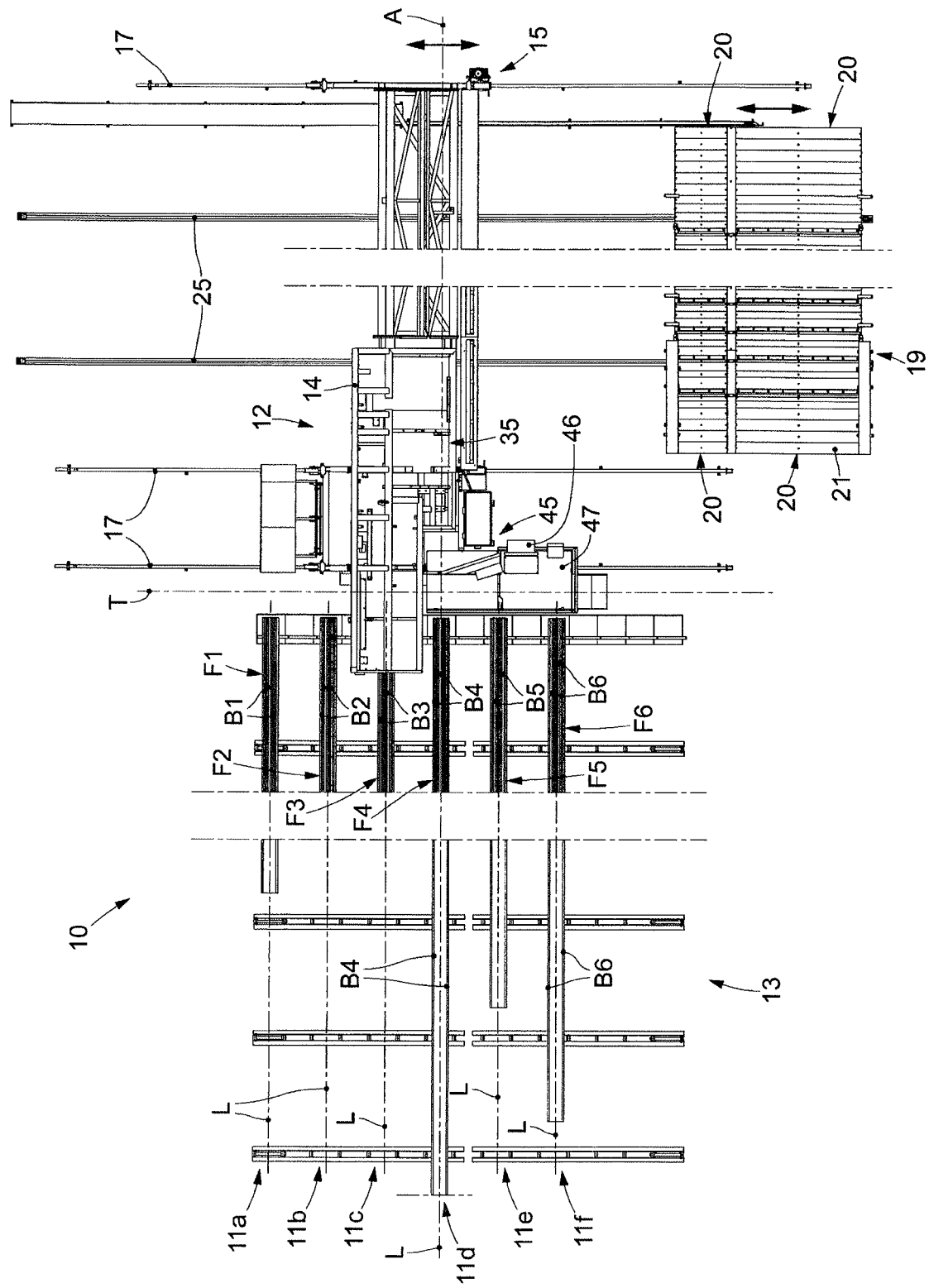
FIG. 2 is a first plan view of the present apparatus for working bars, with the work station in a first removal position with respect to the devices for containing the bars.
Figure 3:
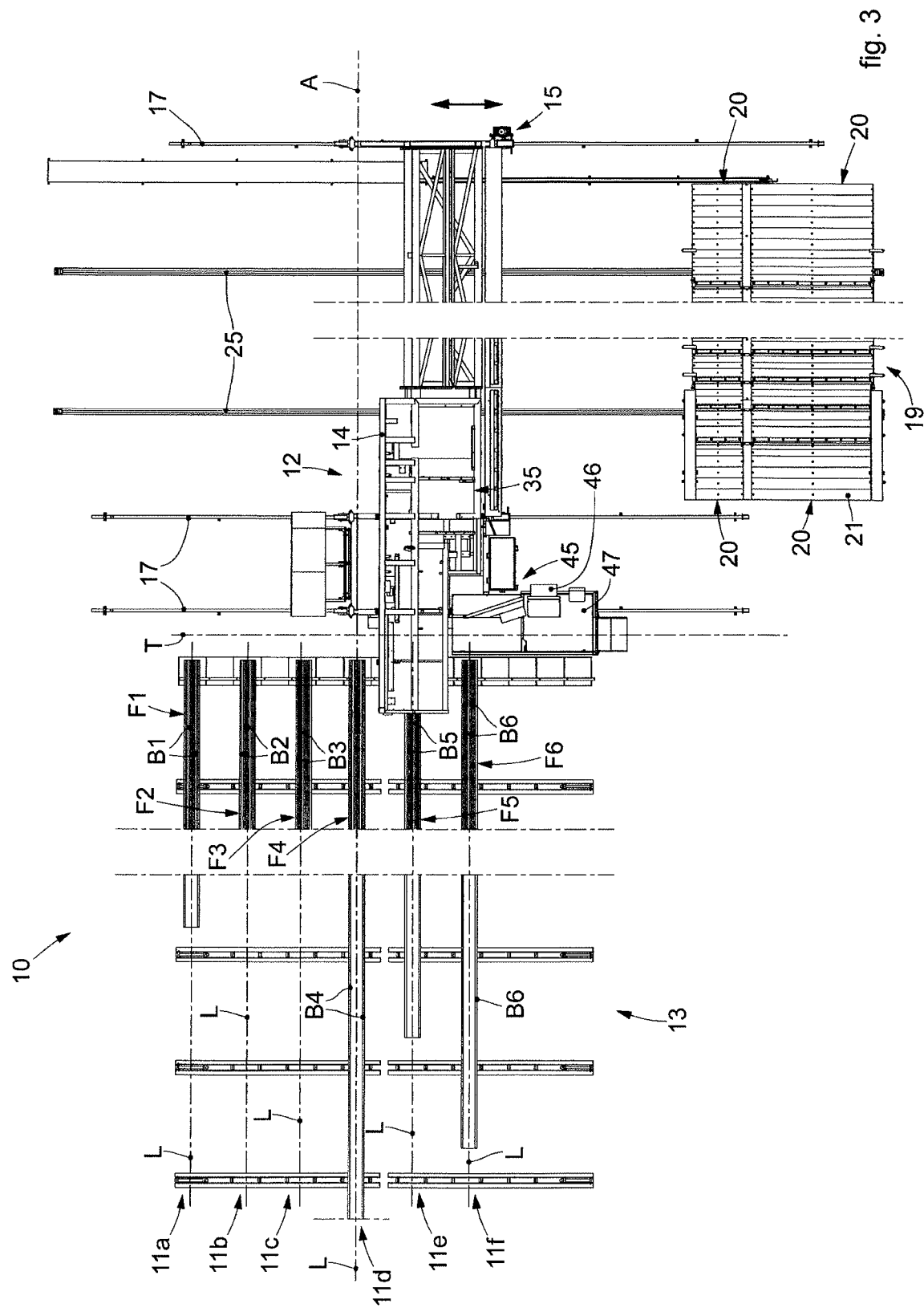
FIG. 3 is another plan view of the present apparatus for working bars, with the work station in a second removal position with respect to the devices for containing the bars.

The work apparatus also comprises a command station 45, see FIG. 2 and FIG. 3, from which the operator can manage all the operations of the work cycle of the bars. The command station 45 can comprise at least one processor 46 connected at least to the removal device 26, the drawing unit 29 and the bending device 35.

Preferably, the command station 45 is positioned on a platform 47 which is associated with the work station 12, therefore it is suitable to translate, in a two-directional manner, in the transverse direction T together with the work station 12.

Comparing FIG. 2 and FIG. 3, it can be seen how in FIG. 2 the work station 12 is positioned in correspondence with the containing device 11c in which the bundle F3 of bars B3 is contained, while in FIG. 3 the work station 12 has been translated with respect to the substantially fixed containing devices 11a-11f, to be taken into correspondence with the containing device 11e of the bundle F5 of bars B5, so as to remove at least one bar B5 from the containing device 11e.

Advantageously, while the work station 12 proceeds to work the bar B3, for example by means of the bending device 35, it can also be already translated toward the containing device 11e to remove a bar B5 which, for example, is supposed to be worked thereafter in the process of working and producing finished products.

The collection station 19 for the finished products, moreover, is substantially independent from both the modular store 13 and the work station 12, so it can be translated in the transverse direction T to be positioned under the work station 12 in the most appropriate manner, so as to collect the finished products in the corresponding containing devices 20.

As can be seen by observing the figures, the work station 12 can be efficiently translated in direction T to be positioned in correspondence with any one of the containing devices 11a-11f whatsoever, which on the contrary are substantially fixed.

The present work apparatus 10 thus allows to obtain different advantages with respect to known work apparatuses or machines, that is, to combine the flexibility of a store provided with a plurality of substantially fixed containing devices with the multiple workings of the bar which can be carried out with the work station, for example cutting the bar to size, bending, shaping, stirrup-making and calendering, or other.

Since they are substantially fixed in position, the containing devices 11a-11f allow to save space compared with a mobile store, also given the overall simpler structure of the present work apparatus 10 for bars.

Since the bar containing devices 11a-11f are substantially fixed, it is possible to expand or reduce the store as desired by adding or removing one or more of the containing devices 11a-11f, without the constraint, as occurs in known apparatuses and machines, of having to choose, when purchasing the entire apparatus, the modular store according to the types of bars used in a given period.

The modular store 13 can be modified as desired, even after its first installation, for example to allow to house types of bars not previously hypothesized in the initial installation step of the store.

This also allows to optimize the operations to remove the bars, reducing the down times required for format change.

If we observe, for example, FIG. 2 and FIG. 3, it can immediately be understood how advantageously it is possible to provide other containing devices adjacent to the existing containing devices 11a and 11f, to remove one or more of the existing containing devices and possibly replace them with others.

Moreover, the present apparatus for working bars allows to deposit bundles of variable length with the same or different diameter, thus allowing a better optimization of the production cycles.

Moreover, during the working of any bar, since the containing devices 11a-11f are substantially fixed, it is possible to allow the operator to be able to possibly move the bars or bundles of bars to or from the containing devices 11a-11f without danger and without needing to stop the work cycle, as occurs in known mobile stores.

Advantageously, the maneuvering space needed to move the work station 12 with respect to the containing devices 11a-11f is substantially equal to or slightly greater than the overall width of all the containing devices 11a-11f, so that it is possible to interact with all the containing devices provided, from the first to the last. In known mobile stores, on the other hand, the space needed for maneuvering the mobile store is substantially equal to double the width of the mobile store, and therefore quite large.

The present apparatus 10 for working bars also has a total weight much lower than that of a machine with a mobile store with bundles, thus allowing faster movements in the passage from one bundle to another and more precise alignments during the removal of the bar.

As we have seen, the present apparatus 10 for working bars can also be provided with one or more stations to receive the shaped pieces, which can be self-propelled and synchronized with the movement of the work apparatus and therefore the work cycle provided of the bars. The collection station 19 allows to organize and discharge the finished product in an optimal manner.

The collection station 19 therefore offers a number of containing devices in which to organize the finished product, which, advantageously, can be de-constrained from the work apparatus during the discharge of the product even during working. Therefore, even in the receiving station it is possible to maneuver the finished or shaped products in safety and without stopping the work cycle.

It is clear that modifications and/or additions of parts and/or steps can be made to the apparatus and method for working bars as described heretofore, without departing from the field and scope of the present invention.

It is also clear that, although the present invention has been described with reference to some specific examples, a person of skill in the art shall certainly be able to achieve many other equivalent forms of apparatus and method for working bars, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. An apparatus for working bars, comprising:
 a plurality of containing devices (11a-11f) disposed adjacent and parallel to each other and with an oblong development in respective longitudinal directions (L) to contain a respective bundle (F1-F6) of bars (B1-B6),
 at least a work station (12) located downstream of said containing devices (11a-11f), said work station (12) comprising:
  at least a removal device (26) to remove at least one bar (B1-B6) from one of said containing devices (11a-11f),
  an introduction element (31) having a channel (32) oriented in a direction of feed (A) parallel to said longitudinal directions (L) and a frustoconical lead-in portion (33) configured to facilitate alignment of the at least one bar (B1-B6) with the channel (32),
  at least a bending device (35) configured to bend said at least one bar (B1-B6),
  at least a drawing unit (29) positioned upstream of the bending device (35 and configured to move the at least one bar (B1-B6) along the direction of feed (A),
  a gripping unit (48), positioned downstream of the bending device (35), provided with opposing rollers (43, 43') positioned on supports (44) in which at least one of the supports (44) is independently movable in a direction (Z1) substantially orthogonal to the direction of feed (A), thereby varying a distance between the opposing rollers (43, 43'), a first cutting device (49) positioned between the introduction element (31) and the drawing unit (29), and a second cutting device (40) positioned between the drawing unit (29) and the bending device (35), and at least a drive member (15) associated with said work station (12), and configured to move said work station (12) in a transverse direction (T) with respect to said longitudinal directions (L) so as to take said removal device (26) into correspondence with one of said containing devices (11a-11f), which are fixed in position.

2. Work apparatus as in claim 1, wherein said work station (12) comprises a support structure (14) provided with sliding elements (16) positionable on guides (17) directed in said transverse direction (T).

3. The work apparatus as in claim 1, wherein a command station (45) is associated with said work station (12) and configured to manage and control a working operating cycle of the bars (B1-B6).

4. The work apparatus as in claim 3, wherein said command station (45) is associated with the support structure (14) of the work station (12) and is mobile together with said work station (12).

5. The work apparatus as in claim 1, further comprising a collection station (19) to collect finished products, the collection station (19) being located downstream of said work station (12).

6. The work apparatus as in claim 5, wherein said collection station (19) of the finished products is associated with corresponding collection station drive members (23) and is mobile in said transverse direction (T).

7. Work apparatus as in claim 5, wherein said collection station (19) is provided with sliding elements (24) positionable on guides (25) directed in said transverse direction (T).

8. Work apparatus as in claim 5, wherein said work station (12) is super-elevated with respect to the floor (P) so that said collection station (19) can be moved under said work station (12).

9. The work apparatus as in claim 5, wherein said containing devices (11a-11f) form a modular store (13) independent of said work station (12) of the bars (B1-B6) and of said collection station (19) of the finished products.

10. A method for working bars using the apparatus for working bars as in claim 1, the method comprising:

moving the work station (12) with respect to the containing devices (11a-11f) disposed adjacent and parallel to each other, so as to present said work station (12) on each occasion in correspondence with one of said containing devices (11a-11f), which are fixed in position;

removing at least one bar (B1-B6) from said containing devices (11a-11f); and bending and then shaping the bar removed from the corresponding containing device (11a-11f) by means of said work station (12).

11. The work apparatus of claim 1, wherein the drawing unit (29) comprises associated rollers (34) for advancing the at least one bar (B1-B6) along the direction of feed (A).

12. The work apparatus of claim 1, wherein the rollers (43, 43') are configured to advance the bars (B1-B6) along the direction of feed (A).

* * * * *